G. GNÜCHTEL.
PROCESS OF ELECTRIC WELDING.
APPLICATION FILED JAN. 15, 1913.
1,094,141.
Patented Apr. 21, 1914.
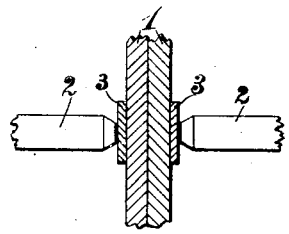
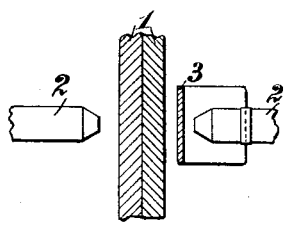
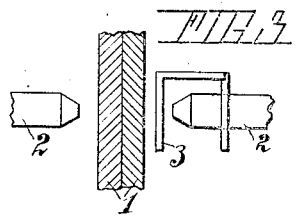
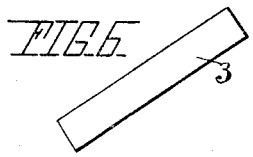
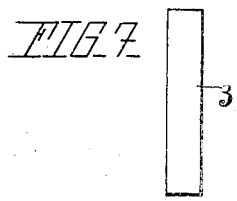
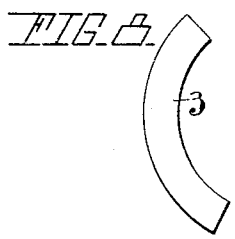
Witnesses:
P. F. Nagle
L. Douville
Inventor:
Guido Gnüchtel
By Wiederheim + Fairbanks
Attorneys.

UNITED STATES PATENT OFFICE.

GUIDO GNÜCHTEL, OF LAUTER, GERMANY.

PROCESS OF ELECTRIC WELDING.

1,094,141. Specification of Letters Patent. Patented Apr. 21, 1914.

Application filed January 15, 1913. Serial No. 742,209.

*To all whom it may concern:*

Be it known that I, GUIDO GNÜCHTEL, a German subject, residing at Lauter, in the Kingdom of Saxony, German Empire, have invented new and useful Improvements in Processes of Electric Welding, of which the following is a specification.

My invention relates to a method of electrically welding metal bodies, as particularly herein set forth and claimed.

Under this invention I interpose between one or each of the parts to be welded and the appertaining electrode an intermediate layer of metal or other substance possessing the necessary conductivity and requiring a greater welding heat than the aforesaid parts. By this method clogging of the electrodes is avoided and the intermediate layer is removable with the electrode after welding. For convenience the said intermediate layer which may be of any suitable formation, is, preferably, detachably connected to the electrode in any suitable manner.

The accompanying drawing shows by way of illustration or example one method of carrying out the process according to the present invention.

On the drawing:—Figure 1 shows one form of device illustrating the invention. Fig. 2 is a similar view but according to which the intermediate layer is slidably connected to one of the electrodes. Fig. 3 is a plan of Fig. 2 while Figs. 4 to 8 show different forms of the construction of the intermediate layer.

Similar numerals of reference indicate the same or similar parts in the figures of the drawing.

1 denotes the two parts to be welded together, 2 the electrodes, and 3 the intermediate layers of metal or any other suitable substance possessing the necessary conductivity and requiring a greater welding heat than the parts 1. These layers may be positioned loosely between the electrodes and the part being welded as illustrated at Fig. 1, or slidably connected to the electrodes as shown at Figs. 2 and 3. The individual portions are shown out of mutual contact in these last mentioned figures.

The described process of electric welding is especially adapted for welding aluminium but it may be used advantageously when welding other metals, or alloys such as brass.

What I claim is:—

The process of electric welding, consisting in depositing between the electrodes and the parts to be welded, an intermediate layer requiring a higher welding heat than the said parts, and then causing an electric current to pass, by means of the electrodes, through said intermediate layer and the parts to be welded, the said intermediate layer being removed with the electrode after welding, substantially as set forth.

In witness whereof I have hereunto signed my name this thirtieth day of December 1912, in the presence of two subscribing witnesses.

GUIDO GNÜCHTEL.

Witnesses:
EMIL GYER,
M. J. BENNDORF.